United States Patent [19]
Scales et al.

[11] Patent Number: 6,112,291
[45] Date of Patent: *Aug. 29, 2000

[54] METHOD AND APPARATUS FOR PERFORMING A SHIFT INSTRUCTION WITH SATURATE BY EXAMINATION OF AN OPERAND PRIOR TO SHIFTING

[75] Inventors: Richard H. Scales, Nice, France; Jerald G. Leach, Richmond, Tex.

[73] Assignee: Texas Instruments Incorporated, Dallas, Tex.

[ * ] Notice: This patent is subject to a terminal disclaimer.

[21] Appl. No.: 09/012,325

[22] Filed: Jan. 23, 1998

Related U.S. Application Data

[60] Provisional application No. 60/036,225, Jan. 24, 1997.
[51] Int. Cl.[7] .................................................. G06F 9/30
[52] U.S. Cl. .......................... 712/200; 712/220; 712/223; 712/224
[58] Field of Search ..................... 712/200, 220, 712/223, 224

[56] References Cited

U.S. PATENT DOCUMENTS

| | | | |
|---|---|---|---|
| 5,572,689 | 11/1996 | Gallup et al. | 712/200 |
| 5,663,808 | 9/1997 | Park | 358/440 |
| 5,781,789 | 7/1998 | Narayan | 712/23 |

*Primary Examiner*—Meng-Ai T. An
*Assistant Examiner*—Mackly Monestime
*Attorney, Agent, or Firm*—Gerald E. Laws; W. James Brady, III; Frederick J. Telecky, Jr.

[57] ABSTRACT

A microprocessor 1 has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written, and a memory 22. The microprocessor can execute an instruction which shifts a source operand a specified number of bits and saturates the result if a numerical overflow would result from the shift. Execution unit S1 has circuitry for saturating a destination operand by setting all bits within the destination to represent a most positive or a most negative number in a same single instruction execution phase in which the shift would have occurred if not for the overflow. The saturation circuitry examines the source operand prior to shifting to determine if the destination should be saturated.

20 Claims, 11 Drawing Sheets

FIG. 3A

| Pipeline Phase | Symbol | During this Entire Phase | By the End of This Phase |
|---|---|---|---|
| Program Address Generate | PG | | ▫ Except when a program store is in E1, PFC and PADDR and latched to their next values: either the next 8-word boundary after the current PFC or a branch target address.<br>▫ When a program store is in E1, the PFC remains unchanged and PADDR takes the value from the program store instruction. |
| Program Address Send | PS | ▫ PFC valid on PADDR.<br>▫ If a fetch packet fetch needed, PRS set active. | ▫ If PRS active, PMS latches PADDR. |
| Program Wait | PW | ▫ If the fetch packet indicated by the last PRS is necessary, PDS is asserted. | ▫ If PDS is asserted, PMS latches the last requested fetch packet to be driven during PR. |
| Program Data Receive | PR | ▫ If PDS active during the associated PW, PMS drives requested fetch packet onto PDATA_1. Otherwise the previous fetch packet driven on to PDATA_1 is maintained. | ▫ If it can be determined that the fetch packet requested by an active PDS in PW is needed, CPU latches this fetch packet on PDATA_1. Otherwise, this latch maintains state. |
| Dispatch | DP | | ▫ Parallelism of the fetch packet detected.<br>▫ Instructions in the next requested execute packet in the fetch packet dispatched to the appropriate functional units.<br>▫ Detection of the software breakpoint code in the CREG field detected.<br>▫ Multi-cycle NOP, NOP, SWI, and IDLE decoded because they are not passed to individual functional units.<br>▫ PC of the execute packet in DP latched at the end of the cycle as PCDC. |
| Decode | DC | ▫ PCDC valid. | ▫ Control signals for actions during execute decoded. |

FIG. 3B

| Pipeline Phase | Symbol | During this Phase | By the End of This Phase | CPU has Completed Types |
|---|---|---|---|---|
| Execute 1 | E1 | ▫ All Types: Registers read. | ▫ Type ISS: Results written to the register file.<br>▫ Type ISS: Status written to the control register file.<br>▫ Type LD and ST: Address modifications written to the register file.<br>▫ Type LD and ST: DADDR, DBS, and DRNW latched for next phase.<br>▫ Type ST: DDATA_0 latched for next phase.<br>▫ Type BRANCH: PFC and PADDR latches the target address.<br>▫ Type STP: PADDR latches the destination address if no fetch is pending. PWS latched as active for next phase.<br>▫ Types LD, ST, STP, IMPY: Intermediate states latched. | ▫ ISC.<br>▫ BR. |
| Execute 2 | E2 | ▫ Types LD and ST: DBS active and DADDR valid.<br>▫ Type LD: DRNW active.<br>▫ Type ST: DRNW inactive and DDATA_0 valid. | ▫ Type IMPY: Results written to the register file.³<br>▫ Type IMPY: Status written to the control register file.<br>▫ Types LD and ST: DMS latches ADDR.<br>▫ Type ST: DMS latches DDATA_0.<br>▫ Type STP: PMS latches PDATA_0.<br>▫ Type LD: Intermediate states latched. | ▫ IMPY.<br>▫ STD.<br>▫ STP. |
| Execute 3 | E3 | | ▫ Type LD: DMS latches data requested during the last cycle.<br>▫ Types LD: Intermediate states latched. | |
| Execute 4 | E4 | ▫ Type LD: DMS drives on DDATA_1 data requested during associated E2. | ▫ Type LD: DDATA_1 latched.<br>▫ Types LD: Intermediate states latched. | |
| Execute 5 | E5 | | ▫ Type LD: DDATA_1 right-aligned, either sign-extended or zero-filled, and written to the register file. | ▫ LD. |

Opcode
Constant form:

| 31 29 | 28 | 27  23 | 22  18 | 17  13 | 12 | op 6 | 5  2 | 1 0 |
|---|---|---|---|---|---|---|---|---|
| creg | z | dst | src2 | cstb | x | 100010 | 1000 | s p |
| 3 | 1 | 5 | 5 | 5 | | | | 1 1 |

Register form:

| 31 29 | 28 | 27  23 | 22  18 | 17  13 | 12 11 | op 6 | 5  2 | 1 0 |
|---|---|---|---|---|---|---|---|---|
| creg | z | dst | src2 | src1 | x | 100011 | 1000 | s p |
| 3 | 1 | 5 | 5 | 5 | | 6 | | 1 1 |

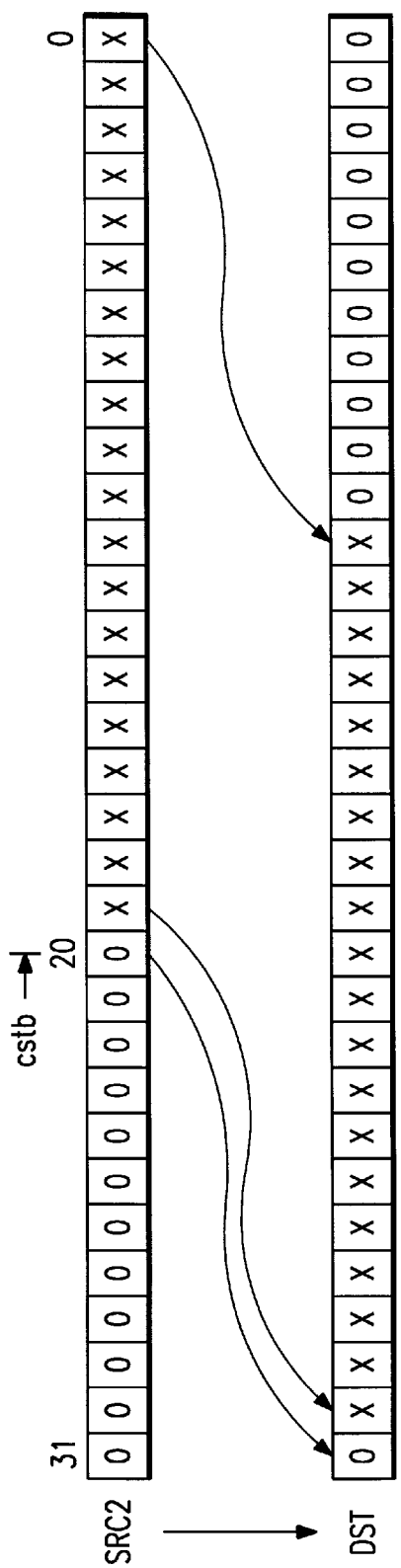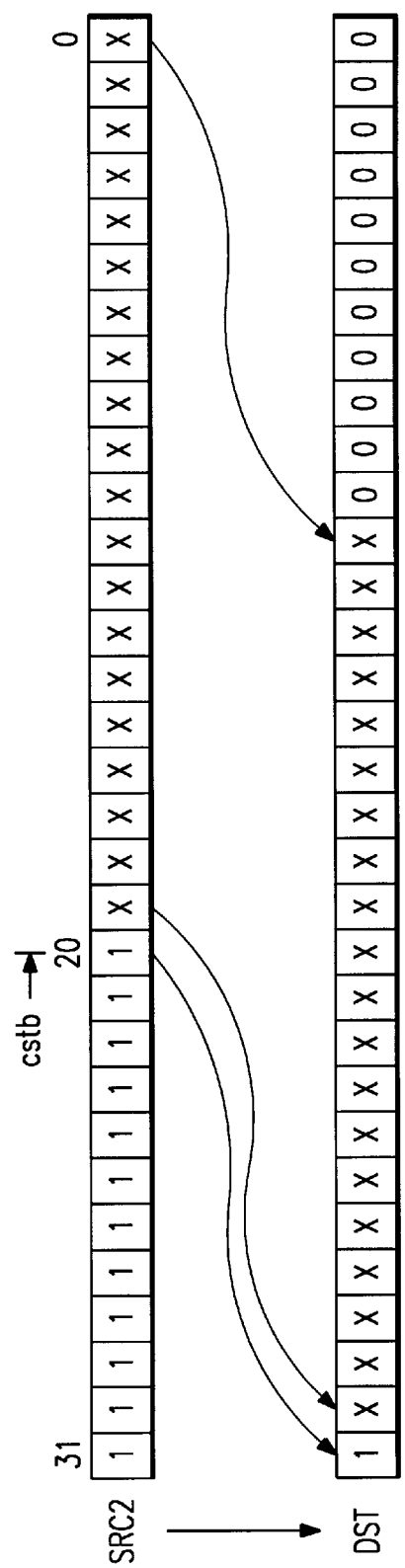

METHOD AND APPARATUS FOR PERFORMING A SHIFT INSTRUCTION WITH SATURATE BY EXAMINATION OF AN OPERAND PRIOR TO SHIFTING

CROSS REFERENCE TO RELATED APPLICATIONS

This application claims benefit of Provisional Application Ser. No. 60/036,225, filed Jan. 24, 1997.

This application is related to coassigned application Ser. No. 09/012,813 filed contemporaneously herewith and incorporated herein by reference.

TECHNICAL FIELD OF THE INVENTION

This invention relates to microprocessors, and particularly relates to architectures of very long instruction word processors.

BACKGROUND OF THE INVENTION

Microprocessor designers have increasingly endeavored to improve performance in various microprocessors by increasing clock speeds and adding parallelism. Complex data manipulations require execution of a number of instructions, which may require several iterative cycles for various types of data manipulations. Some microprocessors contain special instructions for specific types of data manipulations, but these generally require a number of microcode cycles for execution.

An object of the present invention is to overcome the performance delay caused by iterative execution of microcode for a shift instruction when an operand becomes saturated.

SUMMARY OF THE INVENTION

In general, and in a form of the present invention, a data processing device is provided for executing an instruction which shifts a source operand a specified number of bits and saturates the result if a numerical overflow would result from the shift. The device has source circuitry which provides a source operand, destination circuitry to receive a destination operand, and circuitry to hold a constant which specifies the number of bits to shift the source operand. Setting circuitry forms the destination operand by setting all bits within the destination to represent a most positive or a most negative number in a single instruction execution phase.

In another form of the present invention, a method for executing an instruction within a data processing device which shifts a source operand a predetermined number of bits comprises the steps of: providing the source operand; holding a first constant responsive to the shift instruction which indicates the number of bits to shift the source operand; and forming a destination operand by setting all bits in the destination operand to a predetermined value in response to the shift instruction if a set of most significant bits in the source operand corresponding to the first constant are not uniform.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIG. 3A is a chart which illustrates the processing phases of an instruction execution pipeline in the microprocessor of FIG. 1;

FIG. 3B is a chart which illustrates the execution phases of the instruction execution pipeline in the microprocessor of FIG. 1;

FIGS. 6A–6D illustrate the operation of the Shift Left with Saturate instruction of FIGS. 5A–5B;

Corresponding numerals and symbols in the different figures and tables refer to corresponding parts unless otherwise indicated.

DETAILED DESCRIPTION OF EMBODIMENTS OF THE INVENTION

Figure 1:
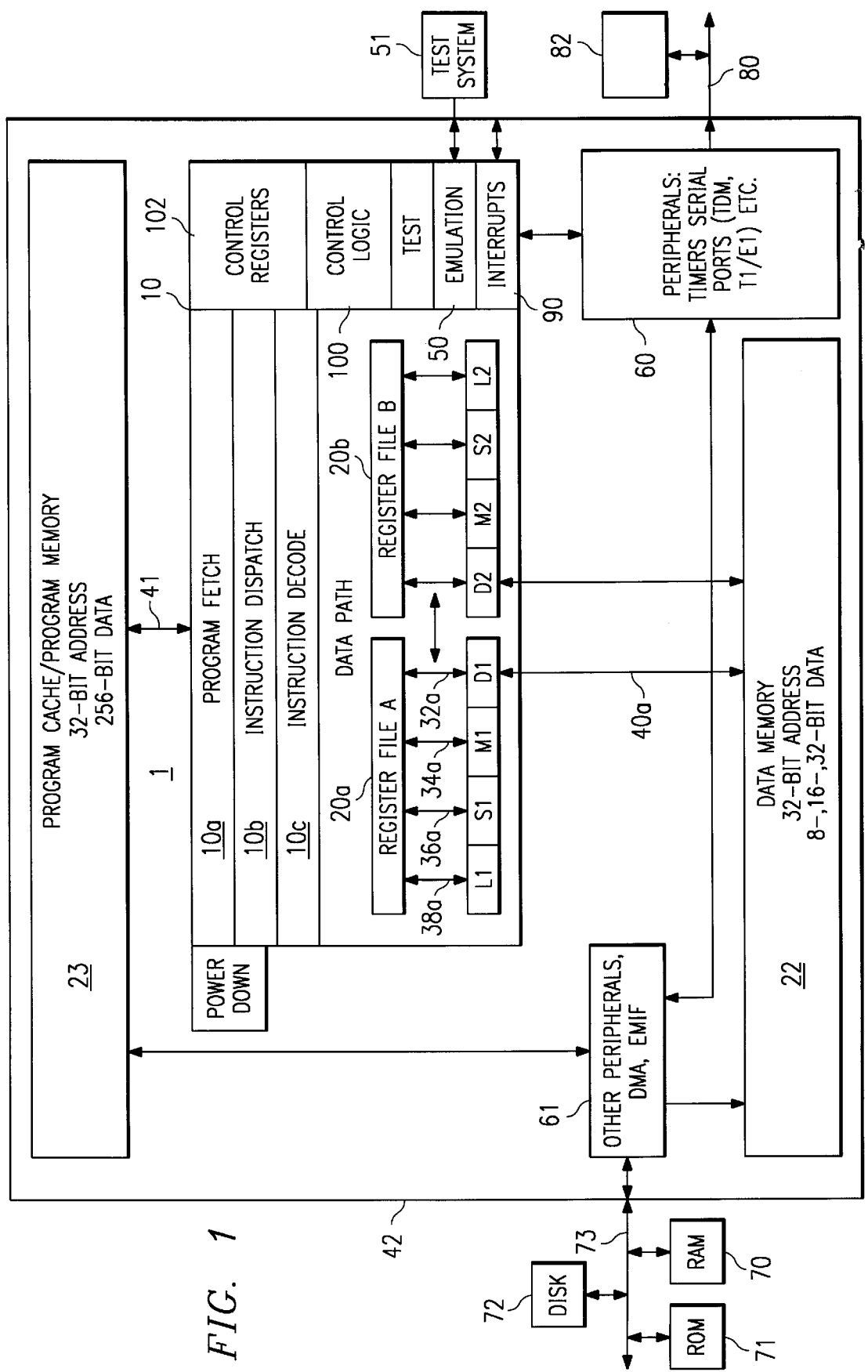
FIG. 1 is a block diagram of a microprocessor which has an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1 is provided in coassigned application Ser. No. 09/012,813 (TI docket number T-25311). A description of a complete set of instructions for the microprocessor of FIG. 1 is also provided in coassigned application Ser. No. 09/012,813 (TI docket number T-25311).

Figure 2:
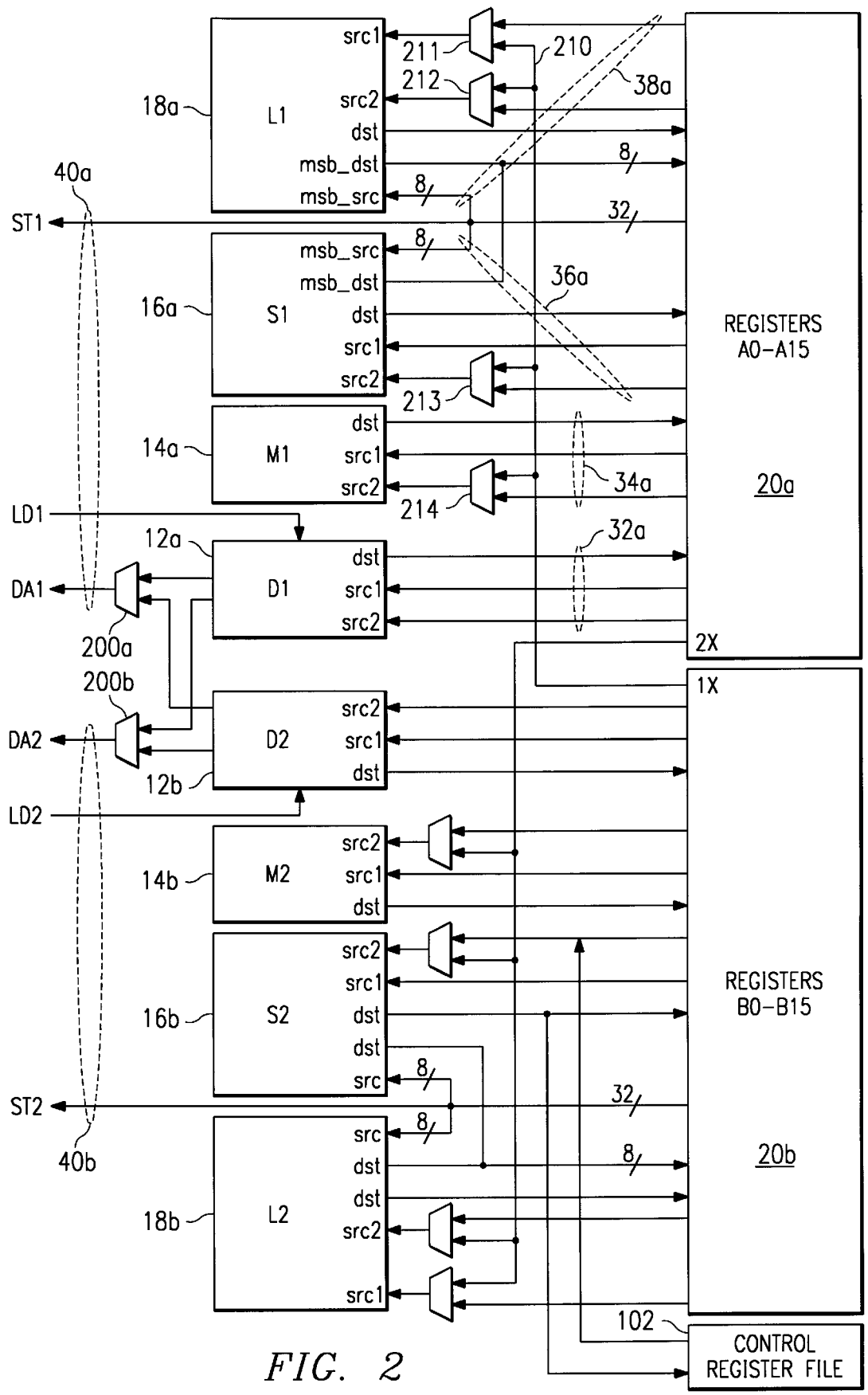
FIG. 2 is a block diagram of the execution units and register files of the microprocessor of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 roads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 3A is a chart which illustrates the processing phases of an instruction execution pipeline in the microprocessor of FIG. 1. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 3A, the first phase of processing an instruction is to generate the program address in phase PG. This is done by loading a program fetch counter PFC which is located in control register file 102. During the second instruction processing phase PS, an address of an instruction fetch packet is sent to program memory 23 via a program address bus PADDR which is part of bus 41. The third phase PW is a wait phase to allow for access time in memory 23. During the fourth phase PR, a program fetch packet is available from program memory 23 via data bus PDATA_I which is part of bus 41. During the fifth processing phase DP, instruction parallelism is detected and instructions that can be executed are dispatched to the appropriate functional units. This aspect of pipeline operation will be described in more detail in later paragraphs. During the sixth processing phase DC, executable instructions are decoded and control signals are generated to control the various data paths and functional units.

FIG. 3B is a chart which illustrates the execution phases of the instruction execution pipeline in the microprocessor of FIG. 1. During the first execution phase E1, single cycle instructions, referred to as "ISC", and branch instructions, referred to as "BR", are completed. A designated execution unit performs the operations indicated in FIG. 3B as directed by control circuitry 100. During the second execution phase E2, the following types of instructions are completed by designated execution units under control of control circuitry 100: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file 20*a* or 20*b*.

Figure 4:
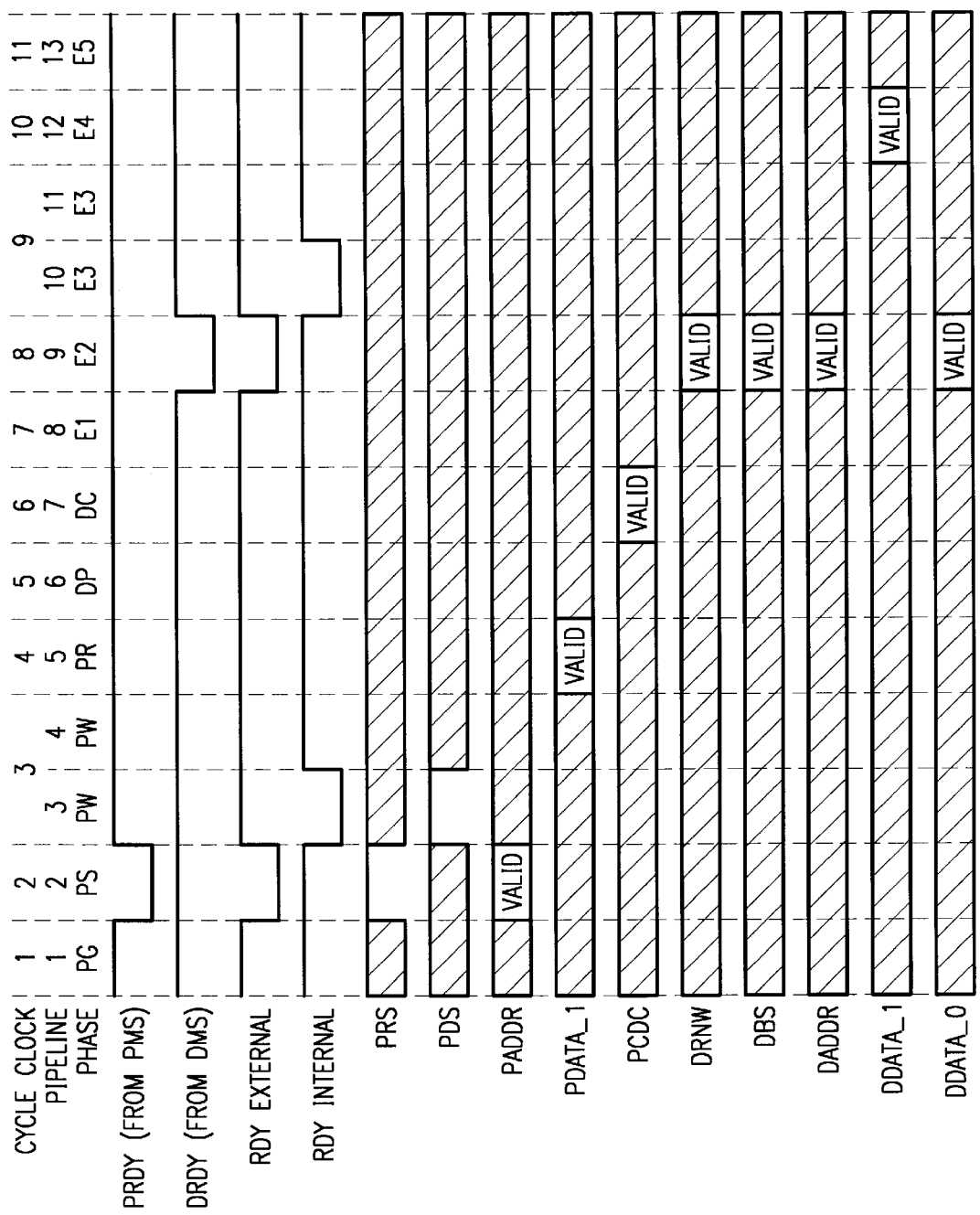
FIG. 4 is a timing diagram which illustrates timing details of processing an instruction fetch packet during the processing phases of FIG. 3A and execution of the execution packet during the execution phases of FIG. 3B.

FIG. 4 is a timing diagram which illustrates timing details of processing an instruction fetch packet during the processing phases of FIG. 3A and execution of the execution packet during the execution phases of FIG. 3B. Note that a pipe stall is illustrated in phase PW due to a program memory ready signal PRDY being low in phase PS, and a second pipe stall in phase E3 due a data memory ready signal DRDY being low in phase E2.

Figures 5A, 5B, 8C:
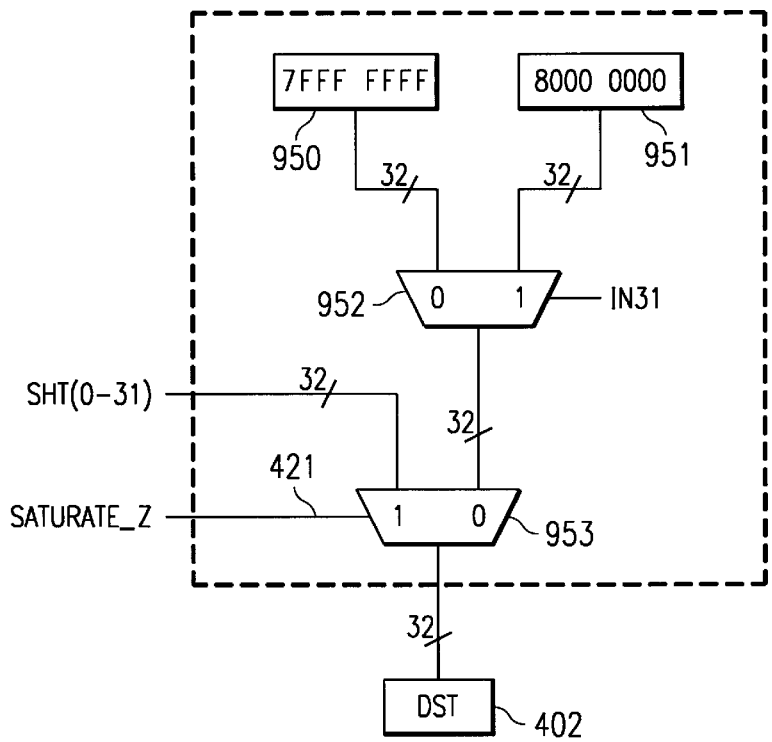
FIGS. 5A and 5B illustrate opcode forms for a Shift Left with Saturate instruction for the microprocessor of FIG. 1.
FIG. 8C is a schematic of setting circuitry of FIG. 7.

FIGS. 5A and 5B illustrate opcode forms for a Shift Left with Saturate instruction for the microprocessor of FIG. 1. FIG. 5A shows a form of the instruction in which the number of bits to shift the operand is specified by a constant field in the instruction itself. A destination field dst specifies a destination register in register file 20*a* which receives the result operand of the instruction. A source field src2 specifies a register in register file 20*a* which holds a source operand which is to be shifted. If bit field "x" is a one, then source field src2 specifies a register in register file 20*b*. A constant field cstb specifies the number of bits to be shifted.

FIG. 5B shows a form of the instruction in which the number of bits to be shifted is specified by two fields in a register in register file 20*a* which is designated by the instruction. The five least significant bits in the specified register are used to specify the shift count. Otherwise, the operation of both forms to the instruction is the same.

FIGS. 6A–6D illustrate the operation of the Shift Left with Saturate instruction of FIGS. 5A–5B. When a Shift Left with Saturate instruction is executed, a source operand stored in a register specified by the source field src2 is selected by execution unit S1. The specified source operand is shifted left by the specified number of bits within execution unit S1. A copy of the modified source operand is then written to a register specified by the destination field dst. However, if the results of the shift operation would result in numerical overflow, then a saturated value is written to the destination register. Likewise, the instruction may be executed on execution unit S2 using register file 20*b* by setting bit "s" in the instruction to a 1. According to an aspect of the present invention, this entire execution operation is advantageously performed in a single execution phase E1 of the instruction execution pipeline of CPU 10.

It has been determined that by examining the contents of the bits in the source operand which are to be lost during the shift before the shift operation is performed, it can be determined if an overflow condition will result from the shift. Thus, according to an aspect of the present invention, detection circuitry which examines the source operand before it is shifted advantageously eliminates the need to monitor the lost bits during the shift operation. Furthermore, it has been discovered that if all of the bits which are between source operand bit 31 and source operand bit(31-shift_count) are either all ones or all zeros, then no overflow will occur as a result of the shift.

FIGS. 6A–6D illustrate a shift in which the shift count, field cstb, is eleven. In this case, bits 0–20 of the specified source operand are shifted left by eleven bits so that source operand bit 20 ends up as destination bit 31. Source operand bit(31-shift_vcount) is thus bit(31-11), or bit 20.

In FIG. 6A, the source operand has zeros in at least bits 20–31. According to an aspect of the present invention, by determining that bits 20–31 are all zeros implies that no overflow will occur when the source operand indicated in FIG. 6A is shifted left eleven bits.

In FIG. 6B, the source operand has ones in at least bits 20–31. According to an aspect of the present invention, by determining that bits 20–31 are all ones implies that no overflow will occur when the source operand indicated in FIG. 6B is shifted left eleven bits.

Figure 6C:
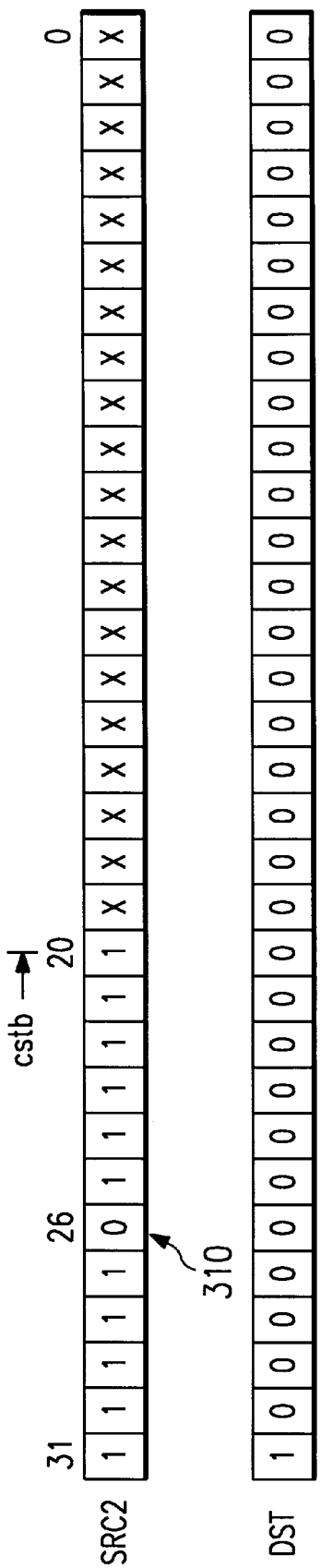

In FIG. 6C, the source operand has ones in at least bits 20–31, except for bit 26 which is a zero. According to an aspect of the present invention, by determining that bits 20–31 are not all ones implies that an overflow will occur when the source operand indicated in FIG. 6C is shifted left eleven bits. Therefore, since the source operand is a negative number, the destination operand is saturated with the largest negative number, 8000 0000h (hexadecimal).

Figure 6D:
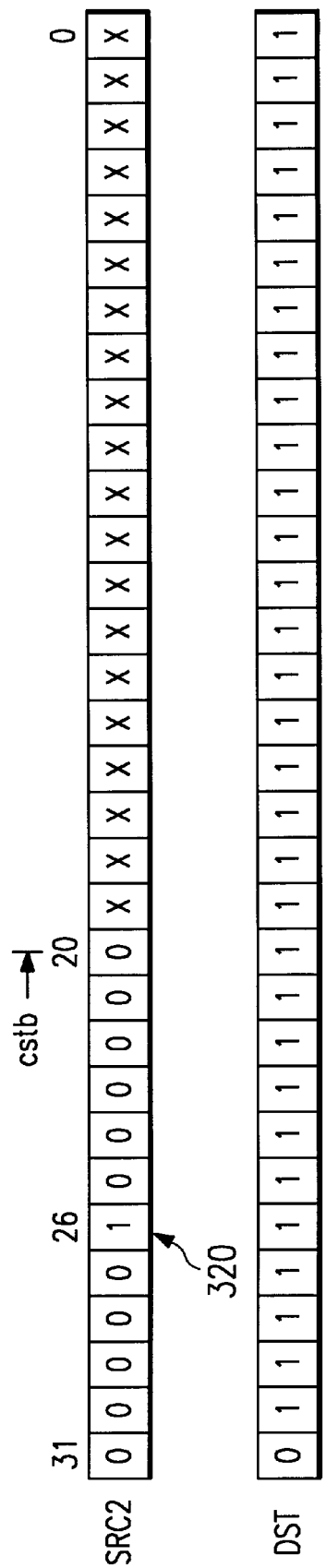

In FIG. 6D, the source operand has zeros in at least bits 20–31, except for bit 26 which is a one. According to an aspect of the present invention, by determining that bits 20–31 are not all zeros implies that an overflow will occur when the source operand indicated in FIG. 6D is shifted left eleven bits. Therefore, since the source operand is a positive number, the destination operand is saturated with the largest positive number, 7FFF FFFFh.

Figure 7:
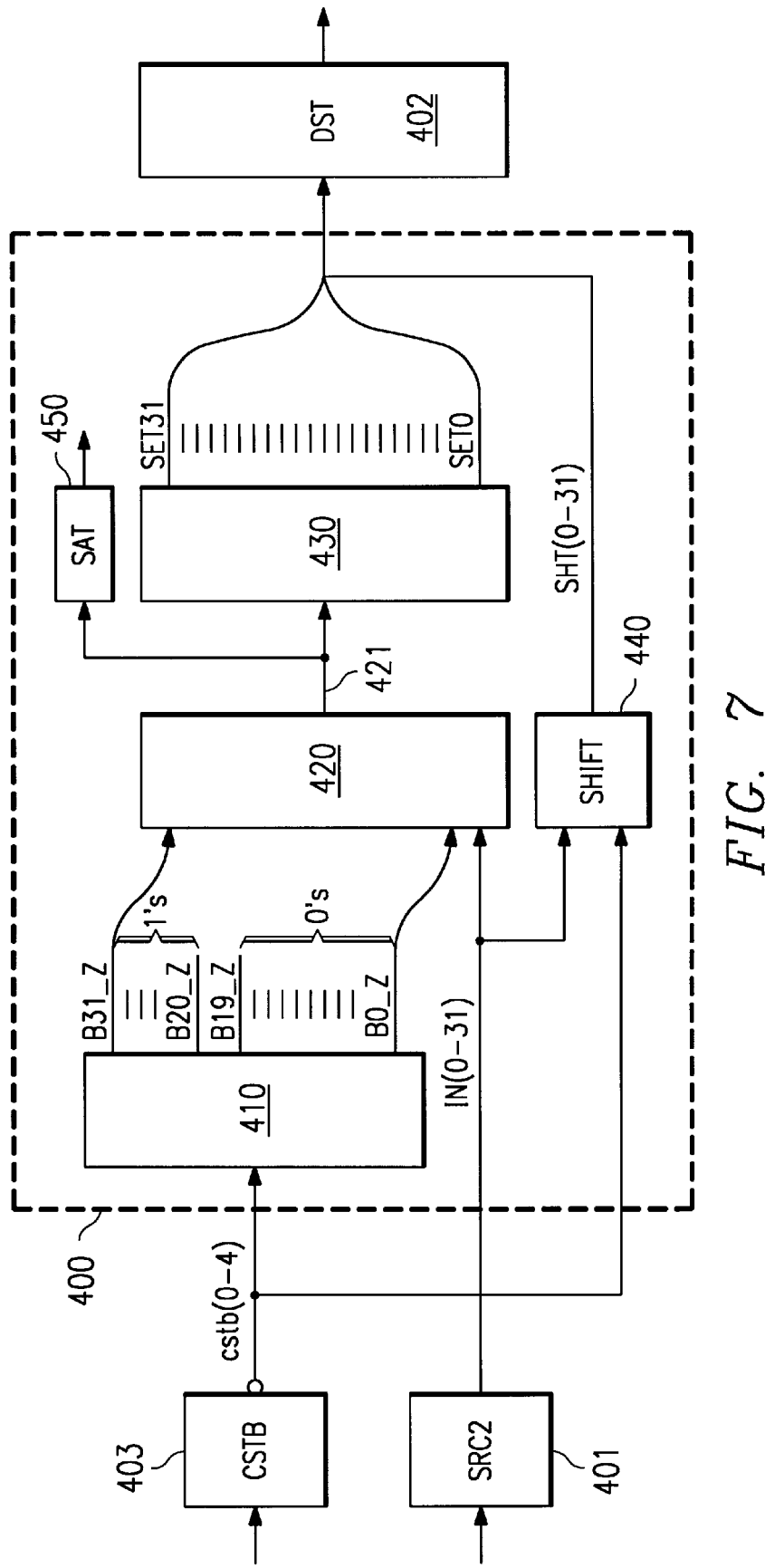
FIG. 7 is a block diagram of logic to implement the Shift Left with Saturate instructions of FIGS. 5A–6D.

FIG. 7 is a block diagram of saturation circuitry 400 to implement the Shift Left with Saturate instructions of FIGS. 5A–6D in a single instruction execution pipeline phase. Saturation circuitry 400 of FIG. 7 is incorporated into execution units S1 and S2 in CPU 10.

In FIG. 7, source operand circuitry 401 is the register selected by source field src2 in a Shift Left with Saturate instruction. Likewise, destination operand circuitry 402 is the register selected by destination field dst in the Shift Left with Saturate instruction. Constant-B holding circuitry 403 hold the data from field cstb from an instruction during execution or from a source register specified by the instruction, as discussed with regard to FIGS. 5A–5B. The output of holding circuitry 403 is inverted, so that an inverted version of constant-B is provided to circuitry 410; Thus, when a shift count of 11, for example, is specified by constant-B, a bit position of bit-20 is specified by the inverted field cstb. Most significant bit (msb) mask generation circuitry 410 forms a 32 bit mask based on a number specified by constant field cstb from the instruction or from the register specified by source field src1 in the instruction. The msb mask has a 1 in all bit positions which are more significant than or equal to the bit position specified by inverted constant cstb. The msb mask has a 0 in all bit positions which are less significant than the bit position specified by inverted constant cstb.

Detection circuitry 420 determines when bits in the source operand in bit positions corresponding to ones in the msb mask are all ones or all zeros. If this condition is not true, then saturate signal 421 is asserted. When saturate signal 421 is asserted, a saturate status bit 450 is set to indicate that a saturate condition has occurred.

Setting circuitry 430 writes a 7FFF FFFF into destination circuitry 402 when saturate signal 421 is asserted and the source operand is positive. Setting circuitry 430 writes a 8000 0000 into destination circuitry 402 when saturate signal 421 is asserted and the source operand is negative. Otherwise, shift circuitry 440 shifts the specified operand by the specified number of bits and writes the results into destination circuitry 402 in one execution phase; phase E1.

Figure 8A:
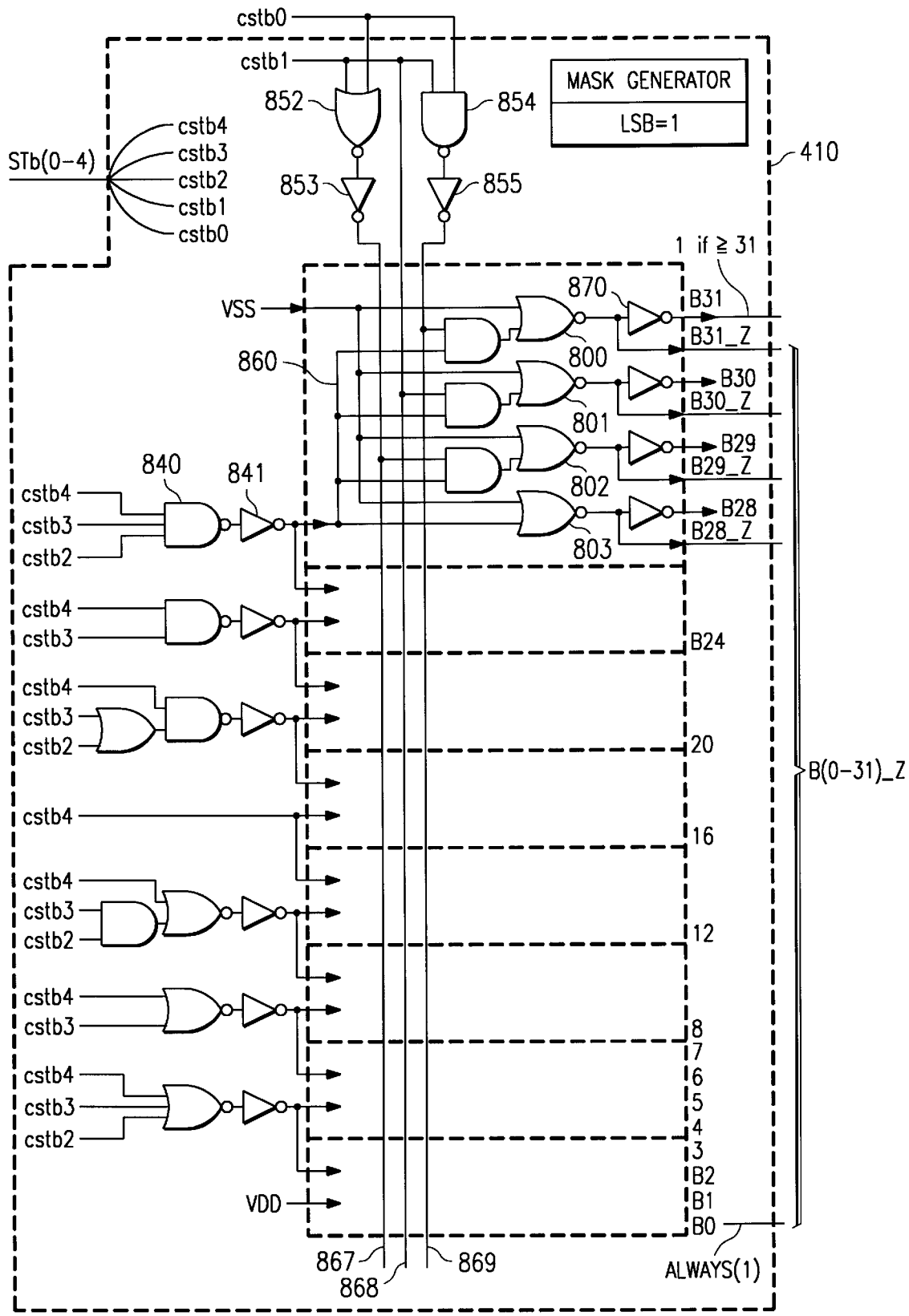
FIG. 8A is a schematic of the msb mask generation circuitry of FIG. 7.

FIG. 8A is a schematic of the msb mask generation circuitry 410 of FIG. 7. The msb mask has a 1 in all bit positions which are more significant than or equal to the bit position specified by inverted constant cstb. The msb mask has a 0 in all bit positions which are less significant than the bit position specified by inverted constant cstb. Inverted constant cstb is a 5 bit constant represented by signals cstb0–cstb4. AND-OR gate 800 receives signal 860 which is 1 if signals cstb2–cstb4 are 1, as determined by NAND gate 840. Gate 800 also receives signal 855 which is a 1 if signals cstb0–cstb1 are both 1, as determined by NAND gate 854. Thus, the output of gate 800, signal B31_bz, is a 0 if cstb is a 11111b which corresponds to a shift count of 0, otherwise signal B31_z is a 1. LSBmask signals B(0–30)_z are formed in a similar manner.

Figure 8B:
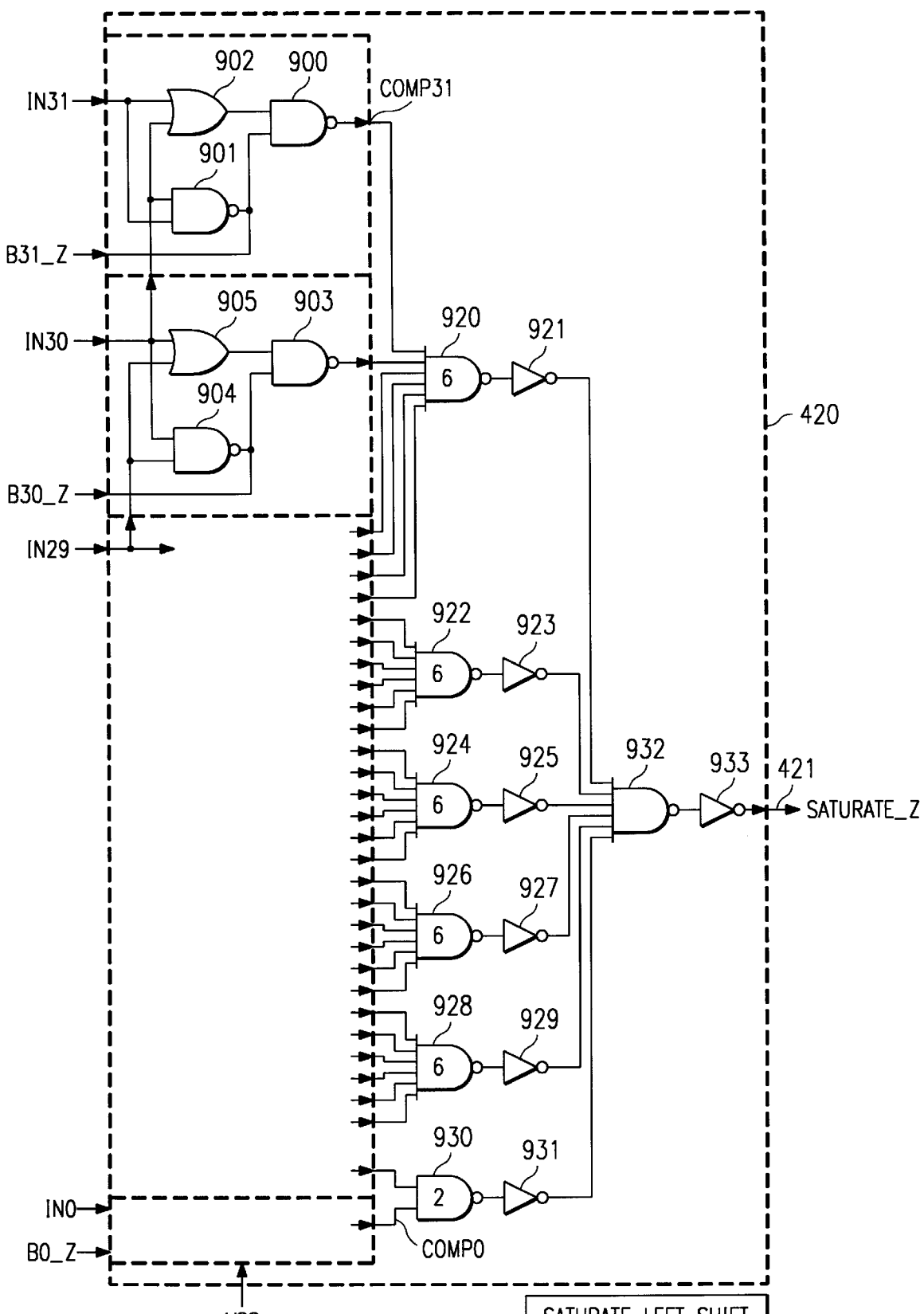
FIG. 8B is a schematic of the detection circuitry of FIG. 7.

FIG. 8B is a schematic of detection circuitry 420 of FIG. 7. Signals IN0–IN31 correspond to respective bits of a source operand specified by source operand field src2 of a Shift Left with Saturate instruction. Signals B(0–31)_z are the LSB mask from LSB mask circuitry 410. Gates 900 and 901 are representative comparison circuitry and are repeated for each bit position. For each bit position where a LSB mask signal B(0–31)_z is 0, an output signal COMP0–COMP31 is a 1. For each bit position where a LSB mask signal B(0–31)_z is 1, the operand signal IN0–IN31 for that bit position is compared to the operand signal from the next least significant bit position. If both operand signals are 0 or both are 1, then output signal COMP0–COMP31 is a 1, otherwise it is 0. For example, when signal B30_z is 0, NAND gate 903 produces output signal COMP30=1. When signal B30_z is 1, NAND gate 904 produces a low output if both IN30 and IN29 are 1, resulting in output signal COMP30 being 1; likewise, OR gate 905 produces a low output if both IN30 and IN29 are 0, resulting in output signal COMP30 being 1. If signal IN30 is not equal to signal IN29, then output signal COMP30 is 0. Thus, if any pair of source operand bits selected by an LSB mask in response to field cstb are not equal, then at least one COMP0–30 signal will be 0.

Gates 920–933 monitor all 32 COMP0–31 signals. If any one of them is 0, then low-true signal SATURATE_z is asserted (by being 0) to indicate that a destination operand should be saturated in response to executing a Shift Left with Saturate instruction.

FIG. 8C is a schematic of setting circuitry 430 of FIG. 7. Constant generator circuitry 950 forms a constant number with a value of 7FFF FFFFb, representing the largest positive number that can be represented in this numerical notation. Constant generator circuitry 951 forms a constant number with a value of 8000 0000b, representing the largest negative number that can be represented in this numerical notation. Mux 952 is operable to select constant 950 when signal IN31 is a 0 indicating the source operand is positive, and to select constant 951 when IN31 is 1 indicating the source operand is negative. A 32-bit output from mux 952 is provided to mux 953. Mux 953 is operable to select the output of mux 952 when the SATURATE_z signal 421 from detection circuitry 420 is asserted (low) to indicate a saturated destination operand is to be formed. Mux 953 is operable to select shifted operand signals SHT(0–31) from shift circuitry 440 when SATURATE_z signal 421 from detection circuitry 420 is not asserted (high) to indicate a destination operand is to be formed from the results of shifting a source operand specified by field src2 in a Shift Left with Saturate instruction. According to an aspect of the present invention, the entire process of forming an LSB mask, detecting a saturate condition, providing a predetermined constant number and shifting a source operand are performed in one execution phase, phase E1, of the instruction execution pipeline of microprocessor 10. Saturate status bit 450 is set at the end of the following instruction execution phase, phase E2.

An alternative embodiment of the novel aspects of the present invention may include other circuitries which are combined with the circuitries disclosed herein in order to reduce the total gate count of the combined circuitry. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device for executing a shift instruction which shifts a source operand a predetermined number of bits, comprising:

source circuitry operable to hold said source operand;

first circuitry operable to hold a first constant responsive to said shift instruction which indicates said predetermined number of bits to shift said source operand;

saturation circuitry connected to said source circuitry operable to examine said source operand and to form a destination operand by setting all bits in said destination operand to a predetermined saturation value in response to said shift instruction if a plurality of most significant bits in said source operand corresponding to said first constant are not uniform; and destination circuitry operable to hold said destination operand.

2. The data processing device of claim 1, further comprising status circuitry which is responsive to said saturation circuitry to hold a status bit which indicates that said plurality of most significant bits of said source operand are not uniform.

3. The data processing device of claim 2, wherein said saturation circuitry further comprises:

first mask generator circuitry operable to form a first mask in response to said first constant;

detection circuitry operable to determine when said plurality of most significant bits of said source operand corresponding to said first mask are not uniform; and setting circuitry operable to provide said predetermined saturation value to said destination circuitry in response to said detection circuitry.

4. The data processing device of claim 3, wherein said setting circuitry is operable to provide a first predetermined saturation value representative of a largest positive number or a second predetermined saturation value representative of a largest negative number in response to a most significant bit of said source operand.

5. A method for executing an instruction within a data processing device which shifts a source operand a predetermined number of bits, said method comprising:

providing said source operand;

holding a first constant responsive to said shift instruction which indicates said number of bits to shift said source operand;

examining said source operand in view of said first constant to determine if a plurality of most significant bits in said source operand corresponding to said first constant are not uniform; and forming a destination operand by setting all bits in said destination operand to a predetermined saturation value in response to said shift instruction if said plurality of most significant bits in said source operand corresponding to said first constant are not uniform.

6. The method of claim 5, further comprising:

forming a status bit which indicates that said plurality of most significant bits of said source operand are not uniform.

7. The method of claim 6, wherein said step of forming a destination operand further comprises:

forming a first mask in response to said first constant;

detecting when said plurality of most significant bits of said source operand corresponding to said first mask are not uniform; and setting said destination operand to a predetermined saturation value in response to said detecting step when said plurality of most significant bits of said source operand are not uniform.

8. The method of claim 7, wherein said step of forming a destination operand further comprises:

setting all bits in said destination operand to represent a maximum positive number if said source operand is a positive number; and setting all bits in said destination operand to represent a maximum negative number if said source operand is a negative number.

9. A signal processing system, comprising:

sensor means for producing a digital signal in response to a physical input representative of a pattern;

a microprocessor having a central processing unit (CPU) and an internal program memory holding instructions for execution by said CPU to recognize the pattern;

said microprocessor further comprising:

source circuitry operable to hold said source operand;

first circuitry operable to hold a first constant responsive to said shift instruction which indicates said predetermined number of bits to shift said source operand;

saturation circuitry connected to said source circuitry, operable to examine said source operand and to form a destination operand by setting all bits in said destination operand to a predetermined saturation value in response to said shift instruction if a plurality of most significant bits in said source operand corresponding to said first constant are not uniform; and destination circuitry operable to hold said destination operand.

10. The signal processing system of claim 9 wherein said sensor means includes a microphone and an analog-to-digital converter and said program memory holds instructions for a speech recognition process.

11. A data processing device for executing a shift instruction which shifts a source operand a predetermined number of bits, comprising:

source circuitry operable to hold said source operand;

first circuitry operable to hold a first constant responsive to said shift instruction which indicates said predetermined number of bits to shift said source operand;

saturation circuitry connected to said source circuitry, operable to examine said source operand and to form a destination operand by setting all bits in said destination operand to a predetermined saturation value in response to said shift instruction if a plurality of most significant bits in said source operand corresponding to said first constant are not uniform; and destination circuitry connected to said saturation circuitry, operable to hold said destination operand;

wherein said saturation circuitry further comprises:

first mask generator circuitry operable to form a first mask in response to said first constant;

detection circuitry connected to said mask generation circuitry and to said source circuitry, operable to determine when said plurality of most significant bits of said source operand corresponding to said first mask are not uniform; and setting circuitry connected to said destination circuitry, operable to provide said predetermined saturation value to said destination circuitry in response to said detection circuitry.

12. The data processing device of claim 11, wherein said setting circuitry is operable to provide a first predetermined saturation value representative of a largest positive number or a second predetermined saturation value representative of a largest negative number in response to a most significant bit of said source operand.

13. The data processing device of claim 12, further comprising shifting circuitry connected to receive the source operand, with an output for a shifted source operand connected to the setting circuitry; and wherein the setting circuitry is further operable to provide the shifted operand to the destination circuitry when said plurality of most significant bits of said source operand corresponding to said first mask are uniform.

14. The data processing device of claim 13, wherein the saturation circuitry and shifting circuitry are operable to provide either the shifted operand or the predetermined saturation value to the destination circuitry on a same execution phase of said shift instruction.

15. The data processing device of claim 12, further comprising status circuitry which is responsive to said saturation circuitry to hold a status bit which indicates that said plurality of most significant bits of said source operand are not uniform.

16. A method for executing a shift instruction within a data processing device which shifts a source operand a predetermined number of bits, said method comprising:

providing said source operand;

holding a first constant responsive to said shift instruction which indicates said number of bits to shift said source operand;

forming a first mask in response to said first constant;

detecting when a plurality of most significant bits of said source operand corresponding to said first mask are not uniform; and setting a destination operand to a predetermined saturation value in response to said detecting step when said plurality of most significant bits of said source operand are not uniform.

17. The method of claim 16, wherein said step setting a destination operand to a predetermined saturation value further comprises:

setting all bits in said destination operand to represent a maximum positive number if said source operand is a positive number; and setting all bits in said destination operand to represent a maximum negative number if said source operand is a negative number.

18. The method of claim 17, further comprising the step of setting the destination operand to be the source operand shifted by the number of bits represented by the first constant when said plurality of most significant bits of said source operand are uniform.

19. The method of claim 18, wherein the step of setting a destination operand to a predetermined saturation value and the step of setting the destination operand to be the shifted source operand are done alternatively in a same execution phase of said shift instruction.

20. The method of claim 16, further comprising the step of forming a status bit which indicates that said plurality of most significant bits of said source operand are not uniform.

* * * * *